United States Patent [19]
Ditzler et al.

[11] Patent Number: 5,945,073
[45] Date of Patent: Aug. 31, 1999

[54] THERMOELECTRIC COOLING OF CORONA-DISCHARGE OZONE CELLS

[75] Inventors: Lee C. Ditzler, Diablo; James R. Goad, Newark, both of Calif.

[73] Assignee: Novazone, Livermore, Calif.

[21] Appl. No.: 08/928,696

[22] Filed: Sep. 12, 1997

[51] Int. Cl.⁶ .................................................. B01J 19/08
[52] U.S. Cl. .............................. 422/186.19; 422/186.2; 422/186.07
[58] Field of Search ................ 422/186.19, 186.2, 422/186.07

[56] References Cited

U.S. PATENT DOCUMENTS

| | | | |
|---|---|---|---|
| 4,504,446 | 3/1985 | Kunicki et al. | 422/186.2 |
| 4,877,588 | 10/1989 | Ditzler et al. | 422/186.19 |
| 5,002,739 | 3/1991 | Ditzler et al. | 422/186.19 |
| 5,573,733 | 11/1996 | Salama | 422/186.19 |
| 5,587,131 | 12/1996 | Malkin et al. | 422/186.07 |

*Primary Examiner*—Kishor Mayekar
*Attorney, Agent, or Firm*—Townsend and Townsend and Crew LLP

[57] ABSTRACT

Ozone generation cells using corona discharge to convert molecular oxygen to ozone are cooled by thermoelectric cooling devices clamped between the outer surface of the cell and a heat sink. The heat sink is preferably a finned structure permitting heat dissipation by air passing between the fins, avoiding the need for water cooling of the cell.

13 Claims, 5 Drawing Sheets

5,945,073

THERMOELECTRIC COOLING OF CORONA-DISCHARGE OZONE CELLS

BACKGROUND OF THE INVENTION

1. Field of the Invention

This invention resides in the field of ozone generators using corona discharge to generate ozone from molecular oxygen.

2. Description of the Prior Art

The use of corona discharge to generate ozone from oxygen in air is well known. The process is operated by using high voltage (generally within the range of about 10,000 to about 20,000 volts AC) to create a corona field, and passing dry air through the field to convert a portion of the oxygen in the air to ozone. To generate a useful amount of ozone in a cell of this type, however, the heat generated by the corona discharge must be dissipated since the ozone yield drops as the temperature rises.

Traditional ozone generators use a cooling liquid, usually water, flowing around the exterior of the corona discharge cell. Reliability and consistency are compromised, however, by variations in the temperature of the water due to the seasons, the geographical location of the system, and the variability of the water source. To minimize these variations, many systems refrigerate the water. The variations persist nevertheless, and the systems are further vulnerable to the risk of freezing, which can cause major damage to the pumping and circulating equipment. Also, cooling water can be costly, since industrial users must pay for both the water supply and the cost of discharge.

SUMMARY OF THE INVENTION

The present invention resides in an innovation to a corona-discharge ozone generation cell that enhances the cooling rate of the cell and permits the cell to be efficiently air-cooled. The invention makes use of one or more thermoelectric cooling elements utilizing the Peltier effect to draw heat from the cell and pass the heat to a heat sink. The corona discharge is formed between two parallel plate electrodes, which can be either flat or curved. One type of cell on which these elements can be used is that disclosed in U.S. Pat. No. 4,877,588 (Ditzler et al., Oct. 31, 1989) and U.S. Pat. No. 5,002,739 (Ditzler et al., Mar. 26, 1991). The cells described in these patents are constructed of a pair of coaxial cylinders separated by an annular gap, a central passage inside the inner cylinder, and connecting flow passages arranged such that air or a molecular oxygen-containing gas enters the central passage for longitudinal flow, then transfers to the annular gap for longitudinal flow in the opposite direction before leaving the cell. The cell is constructed to create a corona discharge in the annular gap, causing conversion of the oxygen to ozone at that location and generating heat as well. Heat is removed through the inner cylinder, where it is enhanced by the flow of air through the central passage, while heat removal through the outer cylinder is achieved by the thermoelectric cooling elements contacting the external surface of the outer cylinder. Another type of cell on which the thermoelectric cooling elements can be used is a flat-plate cell in which the corona discharge is created between two flat plates. Still further configurations and types of cells will be readily apparent to those skilled in the art.

DETAILED DESCRIPTION OF THE INVENTION AND PREFERRED EMBODIMENTS

Figure 1:
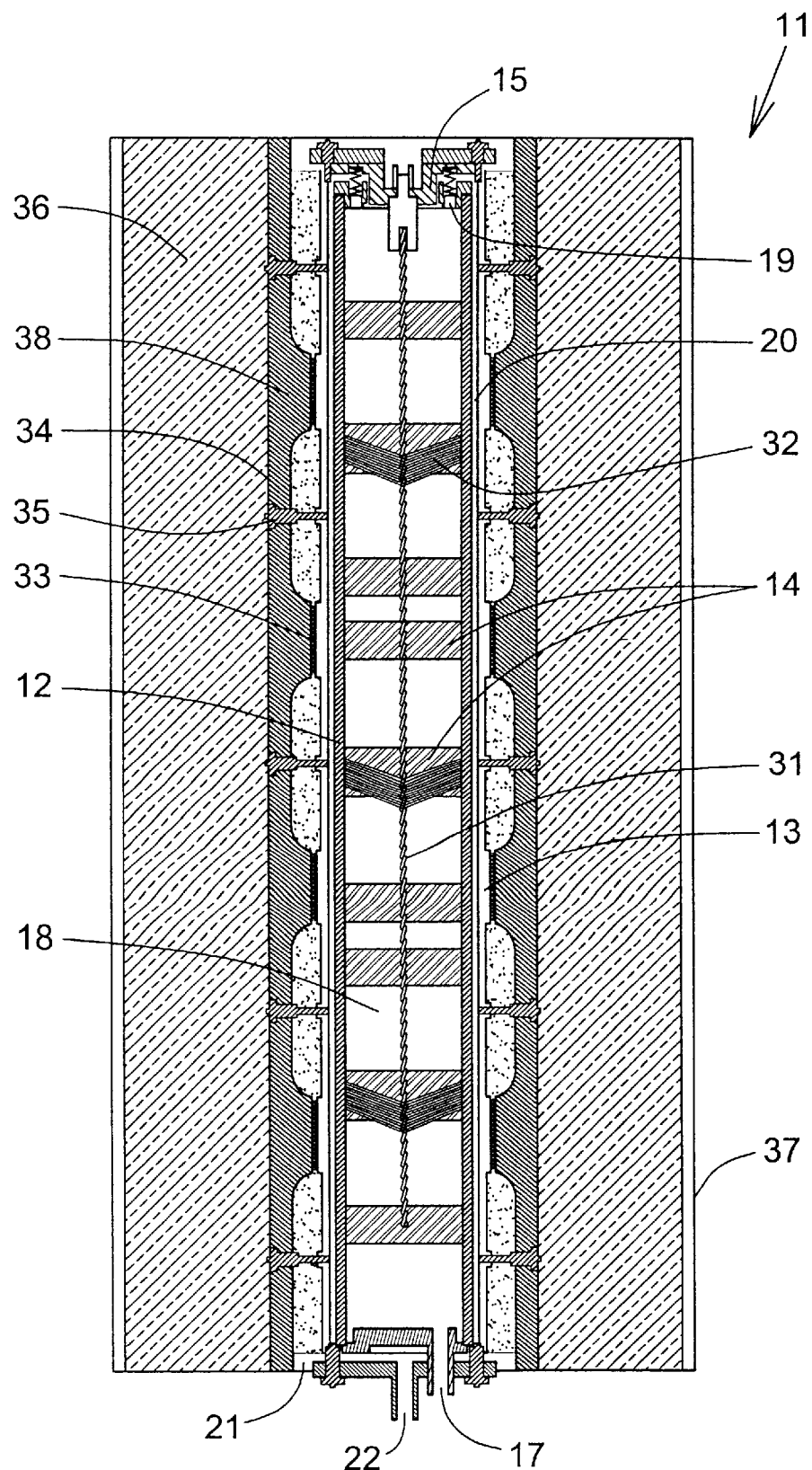
FIG. 1 is a side cross section view of a cylindrical ozone generation cell incorporating the present invention and serving as one example thereof.

The well-known Peltier effect is the production or absorption of heat by the junction of two dissimilar electric conductors when electric current is passed through the junction. The choice between using the Peltier effect as a heating effect or a cooling effect is determined by the direction of the electric current through the junction. The cooling effect for one side of the junction is thus achieved by directing the current to draw heat from that side toward the other side.

Thermoelectric elements or modules utilizing the Peltier effect are constructed with semiconductors as the dissimilar conductors, since semiconductors are good conductors of electricity but poor conductors of heat. A variety of semiconductor materials can be used. A preferred material is bismuth telluride, and the dissimilarity is achieved by appropriate doping of the bismuth telluride to create n-type and p-type semiconductors. Appropriate doping elements will be readily apparent to those skilled in the manufacture of semiconductors. In the typical thermoelectric element, a number of pairs (i.e., couples) of n-type and p-type semiconductors in a planar array are electrically connected in series with appropriate electric leads, and the array is sandwiched between two electrically insulating (generally ceramic) plates. Connection of the electric leads to a DC power source causes one of the plates to serve as the cold side of the element and the other as the hot side. With the cold side placed in contact with a surface to be cooled (such as the outer surface of the corona discharge ozone generation cell), the thermoelectric element serves as a thermoelectric cooling device. Thermoelectric cooling devices of this description are commercially available from sources such as Melcor/Materials Electronic Products, Trenton, N.J., U.S.A., where they are identified as Thermoelectric Heat Pump Modules and Cooling Devices.

The number of couples in a single cooling device can vary, generally ranging from 2 couples to several hundred couples per device, preferably 2 to 500, more preferably 20 to 200. Devices currently preferred for the practice of this invention include 127 couples. The size of the device is not critical, although in most cases, the ranges are from about 0.5 inch (1.3 cm) to about 2 inches (5.1 cm) in length, about 0.5 inch (1.3 cm) to about 2 inches (5.1 cm) in width, and about 0.125 inch (0.3 cm) to about 0.2 inch (0.5 cm) in thickness. Devices currently preferred have the following dimensions: 1.57×1.57×0.16 inches (4.0×4.0×0.4 cm). The power capacity of a single thermoelectric cooling device as a whole can vary widely, depending on the number of couples included in the device. The most common devices range in capacity from about 25 watts to about 125 watts per device.

The number of devices used in connection with a single ozone generation cell in accordance with this invention can vary widely as well, depending on the power load imposed on the cell. The total heat transfer capacity of all devices used on a single cell, in preferred embodiments of the invention, expressed in equivalent watts, will range from about 50 watts to about 500 watts, and most preferably from about 200 to about 4,000 watts. While some cooling effect can be achieved with a single thermoelectric cooling device, two or more are preferred, more preferably two to twenty, and most preferably six to twelve. The power supplied to the cooling devices can vary as well, depending on the needs of the system and the capacities of the individual devices. In most applications, a pulsing DC voltage with a pulse amplitude ranging from about 1 to about 20 volts, preferably from about 6 to about 12 volts, pulsed at a frequency of from about 2,000 Hz to about 10,000 Hz, and preferably from about 4,000 Hz to about 6,000 Hz, imposed on each cooling device will provide the best results. In terms of electric DC current, a preferred operating range is from about 1 to about 10 amperes, and most preferably from about 2 to about 6 amperes. In a presently preferred implementation of the invention, ten cooling devices are used per cell, each cooling device supplied with 10.5 volts of pulsing DC and 5 amperes.

Whether used with a cylindrically shaped ozone generation cell or a flat plate ozone generation cell, the thermoelectric cooling devices are preferably arranged in pairs on opposite sides of the cell, i.e., the cooling surfaces of the devices being parallel to the cylinder axis or to the flat plates. The cooling devices can be stacked to achieve a cascade or multistage cooling effect. Preferably, however, the cooling devices are used in a single-stage configuration, i.e., side-by-side along the heat transfer surface rather than one on top of another. When positioned side-by-side, the devices may or may not touch (provided each is electrically insulated from the others except for common electric leads), although preferably adjacent devices are not in contact, and are separated by electrically and thermally insulating material. This will cause heat transfer to be directed through the devices rather than any intervening regions where the high temperature of the cell exterior may cause damage to parts that it may otherwise be in contact with. In constructions involving a plurality of devices, the devices are preferably arranged symmetrically relative to the axis of the cell.

The invention is susceptible of a wide range of embodiments and useful on ozone generation cells of a variety of configurations. The invention as a whole is perhaps best understood, however, by a detailed examination of specific ozone cell designs and the manner in which the thermoelectric cooling devices are incorporated into the cell construction. Two specific cell designs are shown in the attached drawings.

Figure 2:
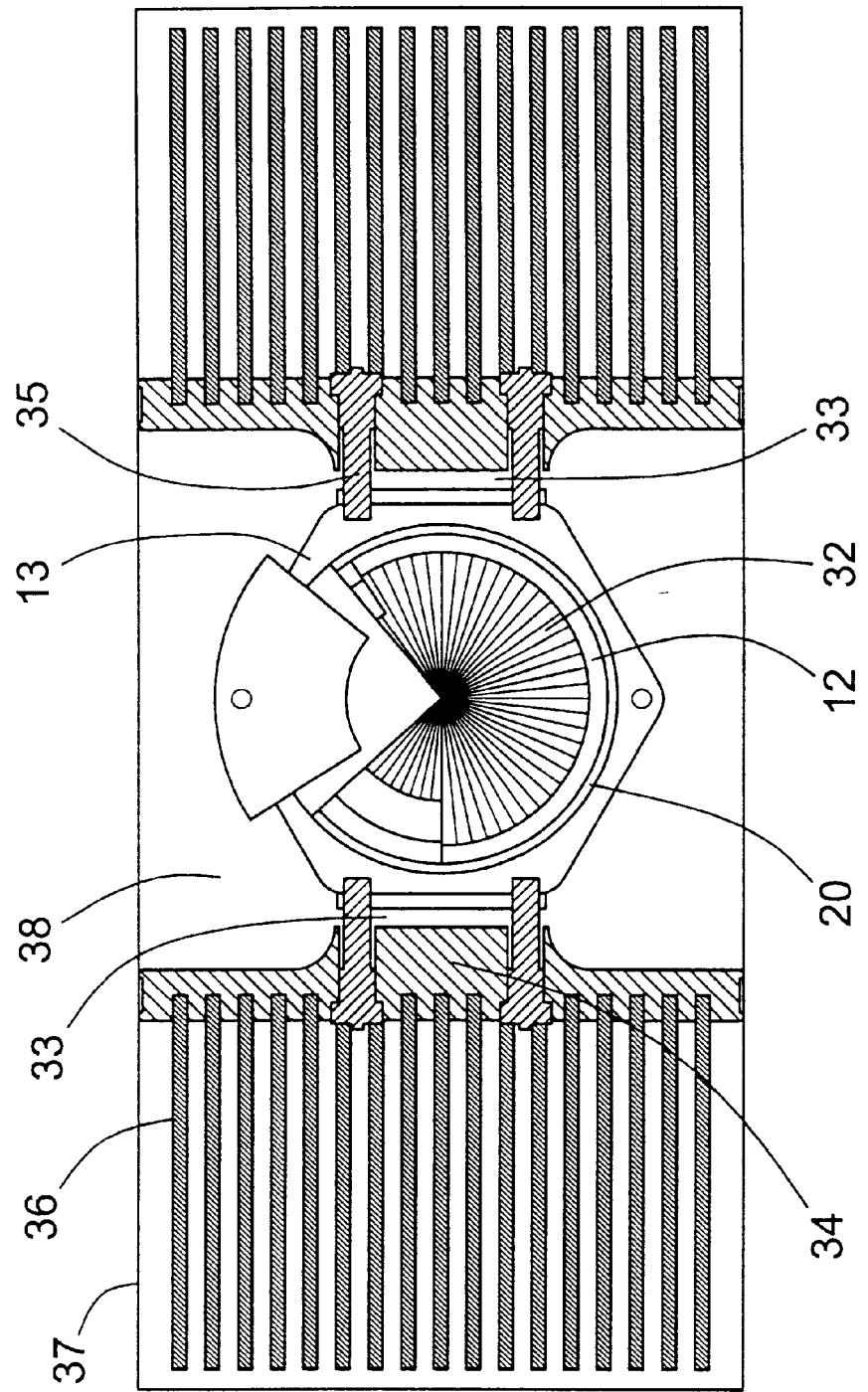
FIG. 2 is an end view in partial cutaway of the ozone generation cell of FIG. 1.

FIGS. 1 and 2 depict a cylindrical ozone generation cell in which the two parallel plates are coaxial cylinders. In the longitudinal cross section of FIG. 1, the ozone generation cell 11 contains a pair of coaxial cylinders including an inner cylinder 12 and an outer cylinder 13. The inner cylinder 12 is formed of a dielectric ceramic material, whose internal surface is plated in bands 14 with a conductor, such as a silver/palladium alloy or nickel. The outer cylinder 13 is thermally conducting but electrically insulating. In a preferred embodiment, this is achieved by using aluminum for the outer cylinder, hard anodized and back-filled with Teflon® (tetrafluoroethylene fluorocarbon polymer) to form an electrically insulating layer on the inside surface. The two cylinders are held in place by machined non-conductive plates 15 (top), 16 (bottom), that align the cylinders to a common central axis. A convenient material of construction for these plates is Teflon, in view of its ease of machining and its ability to form an air-tight connection. An air inlet 17 at the bottom of the cell and extending through the bottom non-conductive plate provides a passage for external air to enter the core passage 18 of the inner cylinder. Connecting passages 19 in the non-conductive plate 15 at the top of the cell permit flow from the core passage to the annular space 20, and back toward the bottom of the device. Further connecting passages 21 at the bottom permit flow from the annular space 20 out through an outlet port 22, where the emerging gas will contain ozone.

Electric elements to form the corona discharge are an axial conductor 31 formed of twisted wire, and a series of brushes 32 extending from the axial conductor to contact the conductive bands 14 on the interior surface of the inner cylinder while letting air pass through the spaces between the individual wires of each brush. Current supplied to the conductor 31 causes corona discharge in the annular space 20 and consequently the conversion of molecular oxygen to ozone in that location. Parameters of the cell that affect its performance include the gap width in the annular space, which is typically within the range of 1–3 mm, the level of power supplied, typically high-voltage AC power at 5,000–20,000 V and 500–10,000 Hz, and the size of the cell, which is typically 6–48 inches (15–122 cm) in length, and 0.5–4 inches (1.26–10.2 cm) in diameter. Detailed disclosures of cells of this type are found in U.S. Pat. No. 4,877,588 (Ditzler et al., Oct. 31, 1989) and U.S. Pat. No. 5,002,739 (Ditzler et al., Mar. 26, 1991), both of which are hereby incorporated herein by reference.

Referring to FIGS. 1 and 2 together, a series of thermoelectric cooling devices 33 are positioned along the outer surface of the outer cylinder 13, where they are clamped between the outer cylinder and plates of heat sink material 34 by a series of clamping screws 35. Extending from the plates of heat sink material 34 are a series of cooling fins 36, both the plates and fins being formed of any thermally conductive material, an example of which is aluminum. The fins 36 are enclosed in a cover shell 37 through which air is circulated to remove the heat from the fins. Separating and surrounding the thermoelectric cooling devices is foam insulation 38 that serves to direct the heat to the fins rather than laterally outward.

Figure 3:
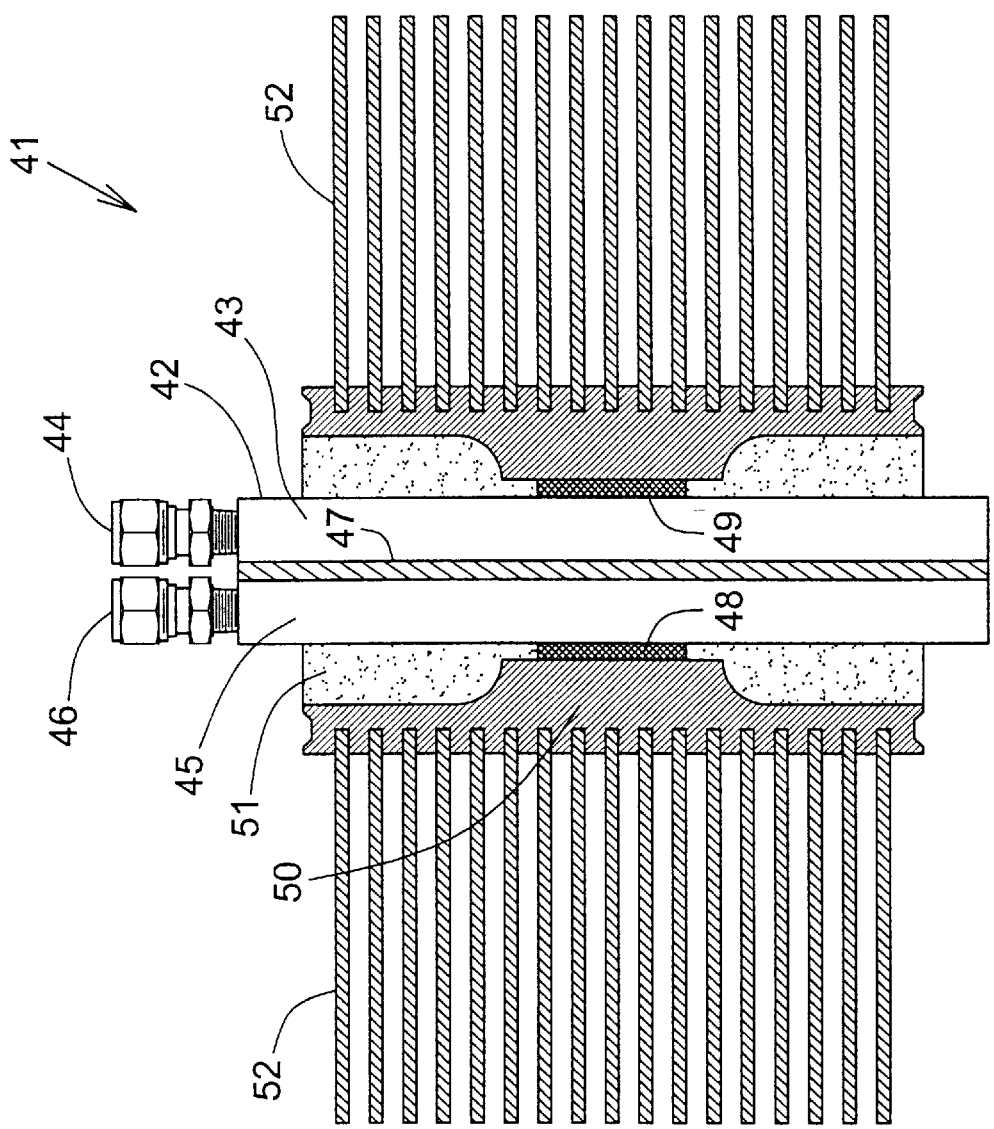
FIG. 3 is a transverse cross section of a flat-plate ozone generation cell incorporating the present invention and serving as another example thereof.
Figure 4:
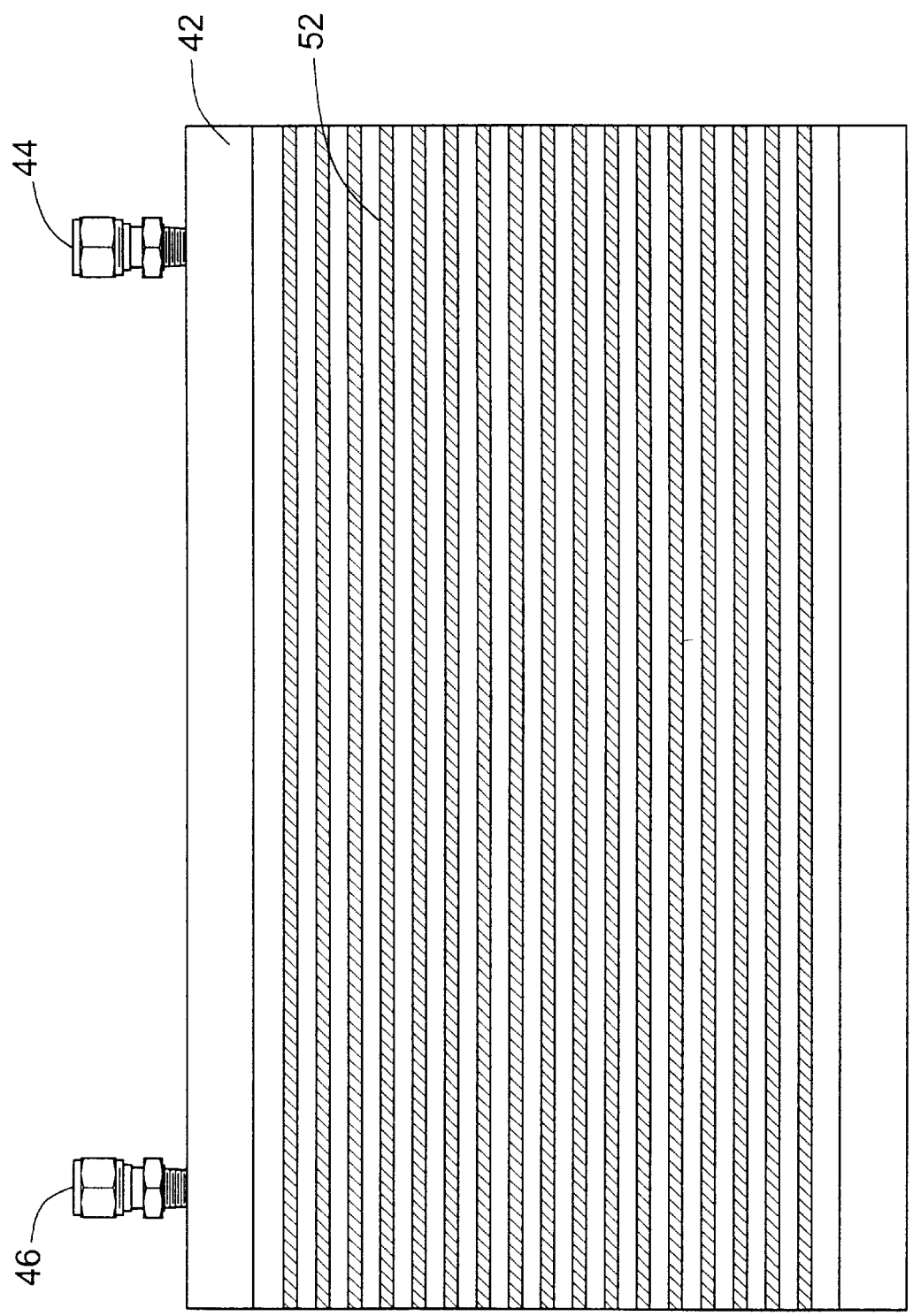
FIG. 4 is an external side view of the cell of FIG. 3.
Figure 5:
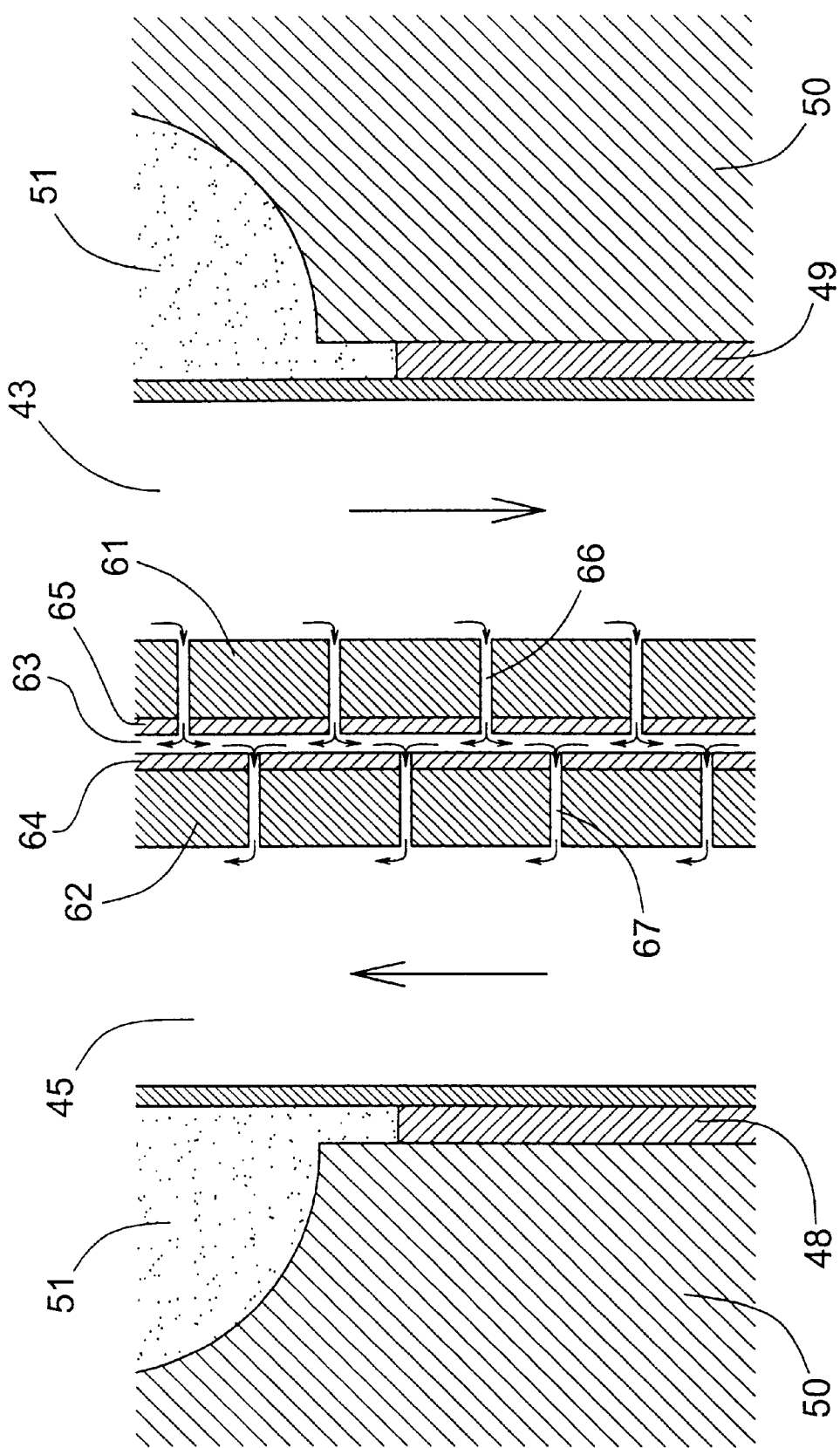
FIG. 5 is an enlarged cross section of the interior of the cell of FIG. 3.

FIGS. 3, 4, and 5 depict different views of a flat-plate ozone discharge cell incorporating the present invention. In the transverse cross section of FIG. 3, the cell 41 consists of a chamber 42, with an inlet air passage 43 fed by an air inlet port 44 and an outlet air passage 45 (for the ozone-containing air) leading to an outlet air port 46. The flat plate electrodes and the gap between them are depicted by the solid line 47 in the center of the chamber. On the exterior of the chamber 42 are shown two thermoelectric cooling devices 48, 49, the heat sink material 50, the foam insulation 51, and the cooling fins 52, all of which correspond in structure and function to the like-named elements of FIGS. 1 and 2. The longitudinal external view of FIG. 4 shows the inlet air port 44, the outlet air port 46, the exterior of the chamber 42, and the cooling fins 52 on one side.

The enlarged cross section view of FIG. 5 shows the details of the flat plate electrodes 61, 62 and the gap 63. As in the cylindrical cell, the facing surfaces of the flat plate electrodes are coated with a dielectric material 64, 65. Each flat plate is perforated with an array of holes 66, 67 communicating the air inlet and outlet passages 43, 45, respectively, with the gap 63. The arrays are offset so that the air entering the holes 66 on the inlet side must flow through the gap 63 in a direction parallel to the plates to reach the holes 67 on the outlet side. As indicated above, the corona discharge and hence the conversion of molecular oxygen to ozone takes place in the gap 63. In this configuration, the thermoelectric cooling devices 48, 49 contact the walls 68, 69 of the chamber rather than the electrodes 61, 62, unlike the cylindrical cell, where the cooling devices contact the electrodes directly.

Additional components and units associated with either of these cells during use will be readily apparent to those skilled in the manufacture and/or use of ozone generation cells utilizing corona discharge. For example, the feed gas is a molecular oxygen-containing gas, which includes both air, oxygen-enriched air, oxygen-depleted air containing oxygen at less than atmospheric amounts, and oxygen that is essentially pure. For convenience, the gas will generically be referred to herein as "air." In typical operation, the air is dried prior to entry into the cell. Drying may be achieved by any conventional means, including pressure-swing molecular sieve absorption. The air can also be refrigerated, pressurized above atmospheric, or both, to increase the ozone yield. The air can be supplied from a pressurized container or a blower.

Both AC and DC power supplies are generally used, the former for the corona discharge and the latter for the thermoelectric cooling devices. Conventional power supplies can be used. In preferred embodiments, however, a resonant power supply that supplies a pulsing DC current is used for the thermoelectric cooling devices.

Ozone leaving the cell can be used in gaseous form or mixed with water for water purification purposes, or used in any manner in which ozone serves a useful function.

The foregoing is offered primarily for purposes of illustration. It will be readily apparent to those skilled in the art that the materials, dimensions, configurations, operating conditions and other parameters of this invention can be further modified or substituted in various ways from the descriptions given above without departing from the spirit and scope of the invention.

We claim:

1. In an apparatus for generating ozone from a gas containing molecular oxygen, said apparatus comprising a chamber comprising first and second parallel electrodes defining a gap therebetween, means for directing said gas through said gap, and means for supplying current to said first electrode to create a corona discharge in said gap, the improvement comprising:

a heat sink secured to said chamber and configured to draw heat generated by said corona discharge, at least one Peltier effect thermoelectric cooling element contacting both said chamber and said heat sink and arranged to transfer heat from said chamber to said heat sink when a direct current passes through said element, and means for supplying said direct current to said at least one cooling element such that heat is transfered from said chamber to said heat sink.

2. An apparatus in accordance with claim 1 in which each of said at least one Peltier effect thermoelectric cooling element is comprised of a plurality of p- and n-type semiconductor couples connected in series.

3. An apparatus in accordance with claim 1 in which said means for supplying direct current is comprised of means for imposing a voltage ranging from about 1 to about 20 volts DC and supplying a current ranging from about 1 to about 10 amperes to each of said at least one Peltier effect thermoelectric cooling element.

4. An apparatus in accordance with claim 1 in which said means for supplying direct current is comprised of means for imposing a voltage ranging from about 6 to about 12 volts DC and supplying a current ranging from about 2 to about 6 amperes to each of said at least one Peltier effect thermoelectric cooling element.

5. An apparatus in accordance with claim 1 in which said at least one Peltier effect thermoelectric cooling element has a total capacity for heat transfer equivalent to from about 50 watts to about 500 watts.

6. An apparatus in accordance with claim 1 in which said at least one Peltier effect thermoelectric cooling element has a total capacity for heat transfer equivalent to from about 200 watts to about 400 watts.

7. An apparatus in accordance with claim 1 in which said heat sink is comprised of a plurality of air-cooled fins of thermally conductive material.

8. An apparatus in accordance with claim 1 in which said first and second parallel electrodes are in the form of inner and outer coaxial cylinders, respectively, said gap is an annular passage between said inner and outer coaxial cylinders, said at least one cooling element is secured to the outer surface of said outer cylinder, and said heat sink is secured to said at least one cooling element.

9. An apparatus in accordance with claim 8 comprising at least two Peltier effect thermoelectric cooling elements in directly opposing positions with said outer cylinder in between.

10. An apparatus in accordance with claim 8 in which said inner and outer coaxial cylinders define a common axis, and said apparatus comprises from two to twenty Peltier effect thermoelectric cooling elements symmetrically arranged relative to said axis.

11. An apparatus in accordance with claim 8 in which said inner and outer coaxial cylinders define a common axis, and said apparatus comprises from six to twelve Peltier effect thermoelectric cooling elements symmetrically arranged relative to said axis.

12. An apparatus in accordance with claim 1 in which said first and second parallel electrodes are in the form of flat plates retained in a housing, said at least one cooling element is secured to said housing, and said heat sink is secured to said at least one cooling element.

13. An apparatus in accordance with claim 12 comprising at least two Peltier effect thermoelectric cooling elements in directly opposing positions with said flat plates in between.

* * * * *